Figure 1:
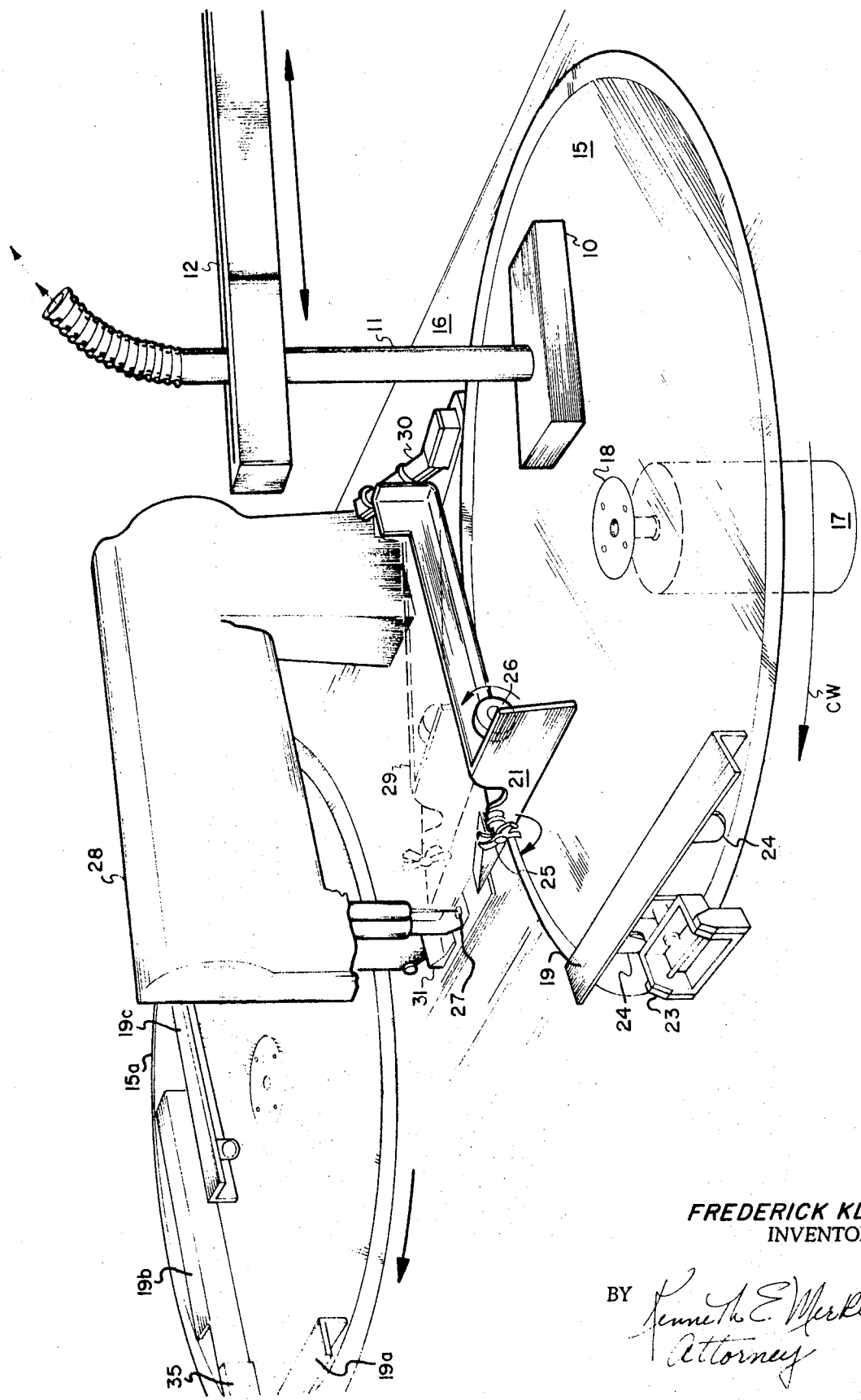

United States Patent

[11] 3,611,960

| [72] | Inventor | Frederick Klein<br>Norwalk, Conn. |
|---|---|---|
| [21] | Appl. No. | 36,366 |
| [22] | Filed | May 11, 1970 |
| [45] | Patented | Oct. 12, 1971 |
| [73] | Assignee | Ivanhoe Research Corporation<br>New York, N.Y. |

[54] ROTATING PLATE WORKPIECE ORIENTING AND POINT-TO-POINT FEEDING APPARATUS
10 Claims, 5 Drawing Figs.

[52] U.S. Cl. ................................................. 112/121.29,
112/203, 112/214, 112/121.15, 271/49, 271/52
[51] Int. Cl. ....................................................... D05b 33/00
[50] Field of Search .......................................... 112/2,
121.11, 121.12, 121.15, 121.18, 121.24, 121.29,
203, 205, 214, 262; 271/7, 49, 52, 68, 86; 198/29

[56] References Cited
UNITED STATES PATENTS

| 1,575,887 | 3/1926 | Zimmerman................ | 112/121.15 |
| 2,542,126 | 2/1951 | Everett et al. ............... | 112/121.15 |
| 2,549,965 | 4/1951 | Fitzgerald..................... | 271/86 |
| 3,357,701 | 12/1967 | Cremer ........................ | 112/121.29 UX |

FOREIGN PATENTS

| 1,085,477 | 7/1954 | France ......................... | 198/29 |

*Primary Examiner*—James R. Boler
*Attorney*—Bryan, Parmelee, Johnson & Bollinger

ABSTRACT: A rotating plate is positioned in the work surface of a tool, in substantially the same plane, adjacent to the work point. Tangential guide stops are positioned so as to intercept workpieces carried by the rotating plate. The interception of the workpieces being carried by the rotating plate creates vector forces which act upon the workpiece, causing a change in the position and orientation of the workpiece with respect to the tool and, according to the relative position of the guide stop, changes the path of travel of the workpiece so as to orient the workpiece and present sequential points of the workpiece in registered relationship to a work point. The rotating plate remains the motive force but the steering of the workpiece into a new path and new position is a function of the guide stop plus the motive force of the rotating plate.

FREDERICK KLEIN
INVENTOR.

FREDERICK KLEIN
INVENTOR

ROTATING PLATE WORKPIECE ORIENTING AND POINT-TO-POINT FEEDING APPARATUS

The present invention relates to workpiece-orienting and workpiece-feeding devices. More particularly the present invention relates to apparatus for orienting and feeding workpieces with respect to a work point, effectively presenting a predetermined part or point of the workpiece to a predetermined point, relative to a work point or work station, and for feeding such workpiece to or into the work point or work station, on a point-to-point registration-feed basis.

In the manufacture of apparel, such as garments, footwear, headwear, etc., a plurality of precut workpieces of particular shapes or patterns are fitted together in predetermined manner and combined by adhesion or by sewing for example. Before fitting and combining some of the workpieces, certain of the workpieces are finished off, in whole or in part, as by serging, hemming or binding the edge of the workpiece. The process of finishing off an edge or part of an edge of a workpiece may be a relatively simple operation or may be relatively complex, depending upon what process of finishing is used and how the process is accomplished, but at the very least, such operation requires that the workpiece be oriented with respect to the work station, for example, the sewing station of a sewing machine, and that the workpiece be fed and/or guided through the sewing station so that a predetermined path, or path of points, along the workpiece passes through the work station, which effectively is a point or work point.

When such an operation is accomplished manually, coordination between the operator's hands and eyes is required. The workpiece must be handled so as to be positioned or oriented with respect to the sewing station and thereupon fed through the sewing station. It is usual to have the operator control the on/off condition of the sewing machine rather than to have the sewing machine operate continuously.

Attempts to automate certain manual operations in the field of apparel manufacture have had various degrees of success. However, problems arise in automated orientation of the workpiece when the workpieces presented for orientation are of different size and/or differ somewhat in contour or pattern.

The present invention overcomes the problems arising in orienting workpieces of different size to the extent that regardless of size, workpieces are automatically oriented and at least point positioned, according to the contour of the workpiece, with respect to a work point, such as a sewing station, within the limits of the workpiece-orienting and workpiece-feeding apparatus. The present invention accomplishes automatic orientation and positioning of workpieces, with respect to a work point, where point-to-point registration is required or preferred.

An embodiment of the present invention includes a work surface, a rotatable plate, the surface of which is in substantially the same plane as the work surface, and one or more workpiece guide stops tangentially positioned with respect to the plate and positioned closely adjacent to the surface of the rotatable plate. The workpiece guide stops or tangential guide stops intercept a workpiece carried on the surface of the rotating plate and create vector forces which act upon the workpiece for changing the position and orientation of the workpiece and the direction of portage or path of travel of the workpiece as moved by the rotating plate.

As will be clearly seen from the diagrams below, the direction of friction forces generated at any point on the rotating, flat surface, such as a plate or disc depends on the radial and arcuate position of such point on the rotating plate. It is reasonable to say that no two points on the surface of a rotating disc or plate provide friction forces exerted or directed in the exact same direction. The resulting forces of all the points at the same radius on the surface of a rotating plate are exerted in a circle. When a workpiece is placed on a rotating plate a plurality of friction forces directly affect the workpiece. By using a predetermined obstacle or stop, here referred to as a tangential guide stop, which intercepts the workpiece carried on the surface of the rotating plate, predictable vector forces are created which act on or influence the course or direction of travel of the workpiece so as to position and orient the workpiece as desired, with respect to a predetermined point or position. It should be pointed out that an obstacle or stop may be in the form of a post or edge of a surface or any other obstacle in addition to a tangential surface.

The speed of rotation of the disc or plate should be within working limits. A plate that rotates too slowly will fail to move a workpiece at sufficient speed while a plate that rotates too fast may "throw" the workpiece off the rotating disc or plate, due to centrifugal force. Thus, compatibility between the size, i.e., weight, of the workpiece and rotational speed of the disc or plate is desirable. The weight of the workpiece and the friction force between the workpiece and the rotating plate and factors to be considered in determining the minimum and maximum speed of rotation of the plate. It will be found, however, that when all factors are considered there is a wide operating range between minimum and maximum rotational speed at which a rotating plate may deliver and position orient a workpiece.

With respect to the size of the workpiece, it will be appreciated that the size of the rotating plate will be a limiting factor on the size (bigness) of the workpiece, however, within the operating range of sizes for the same size rotating plate, a wide range of sizes of workpieces may be position oriented and fed to the same work point without significant adjustment of the parameters, position and components of the apparatus. In addition, changes in style of the finished article, which may include some change in the contour of the individual workpiece, has substantially no effect on the overall operation of the present invention, since workpieces differing substantially in contour, but within the same general shape may be position oriented to the same point position without significant adjustment or change in the apparatus of the invention.

It is therefore an object of the present invention to provide an automatic workpiece-orienting and workpiece-feeding device which is substantially insensitive to size variation of the workpiece.

Another object is to provide an automatic workpiece delivery system which orients and delivers a workpiece to a desired position, in a desired orientation which is substantially insensitive to size variation of the workpiece.

These and other objects will become apparent from reading the following detailed description of the principles of the invention embraced in the exemplary drawings in which:

FIG. 1 illustrates one embodiment of the invention used in a system in which the work station is a sewing machine, and FIGS. 2, 3, 4, and 5 are a series of plan views of the apparatus in which a workpiece is being oriented by a rotating plate and intercepting tangential guide stops and fed into the work point of a sewing machine.

Referring to FIG. 1 in more detail, a supply of workpieces (not shown) may be positioned at some remote position and may be separated, one at a time, and transferred from the supply location to the rotating plate by a transfer device such as represented. The transfer device may deliver the workpiece to the rotating plate and the plate may then carry the workpiece or move the workpiece arcuately to intersect with the tangential guide stops each of which obstructs the arcuate travel of the workpiece and causes vector forces to act upon the workpiece so as to orient and position the workpiece and feed it to a work station, here represented as a sewing machine.

The workpiece transfer device is represented as a vacuum manifold or box 10 and vacuum hose 11. The bottom or underside of the box 10 includes one or more holes or ports through which the vacuum is drawn, the arrows at the upper end of the hose 11 representing a vacuum. The hose 11 is coupled in a track 12 and may be driven back and forth by a reciprocating drive (not shown) from the supply of the workpieces to a position over the rotating plate 15. The transfer device may also include a vacuum cutoff so that in its cycle of operation the vacuum may be cut off at a predetermined position of the vacuum head 10 and the workpiece may be released and deposited on to the rotating plate 15. Thus, a single workpiece from a stack of workpieces may be transferred or delivered to a position so that the single workpiece may be deposited or placed on the plate 15.

The rotating plate 15 may be set in a table or work surface 16 so that the edge of the plate 15 is substantially flush with the table or surface 16.

The rotating plate may be driven by a drive means, represented by a motor 17 coupled to the bottom of plate 15 by a flange 18. The drive means may be a belt or gear drive, if desired. A suitable mounting arrangement (not shown) may be used to support the drive means.

Preferably, the plate 15 is rotated at a substantially constant, uniform speed, sufficiently fast so that the friction forces acting upon a workpiece placed on the rotating plate is sufficient to generate an effective vector force when the workpiece intersects with the face of the guide stop 19 positioned tangential to the plate 15 and off the surface. The guide stop is positioned sufficiently close to the surface of the rotating disc so as to intersect with and thus interrupt the circular or arcuate travel of the workpiece carried on the disc or plate 15.

The illustrated embodiment shows a rotating plate and two tangential guide stops positioned to interrupt the arcuate travel of a workpiece on the plate. The passive forces $p$ created by the tangential guide stop and the friction forces $kf$ created by the rotating action of the plate combine into vector forces $vf$ which position the workpiece into a desired position and orientation and effectively guide the workpiece so that a predetermined point of the workpiece is registered with the work point in the point-to-point registration along the entire edge of the workpiece.

Figure 2:
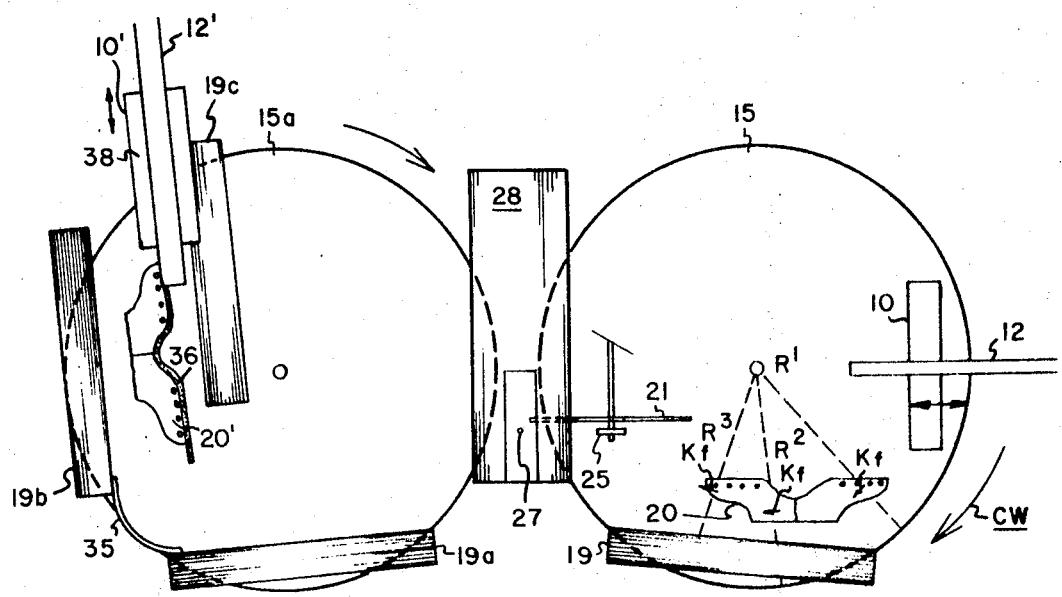

The illustrated embodiments show that the rotating plate or disc and cooperating tangential guide stop apparatus may be used for the precision point-to-point registration and infeed and may also be used for workpiece conveyance and orientation which may not require such precision registration, such as "docking" a workpiece in preparation for removal, as shown on rotating disc 15a in FIG. 2.

As seen particularly in FIGS. 1 and 2, a workpiece may be delivered to and be deposited on the rotating disc 15 by the transfer device 10-12 for precision, point-to-point registration with the work point. After work has been performed on the workpiece, the workpiece 20' (FIG. 2) may be deposited on to another rotating disc 15a and other tangential guide stops such as represented by 19a, 19b, and 19c may be positioned so as to intercept the workpiece carried on the rotating disc 15a so as to position and orient the workpiece 20' for removal from the rotating plate by a transfer means represented by the structure 10'-12'.

It will be noted, in FIG. 2 that the tangential guide stops 19a and 19b are joined by a fence 35. The fence 35 acts as a series of stops, which could be posts, for example, which prevent the workpiece 20' from escaping through the open space between tangential guide stops 19a and 19b.

Directing attention to FIGS. 2 through 5 it will be seen that a workpiece 20 is delivered to and deposited on the rotating plate 15 (FIG. 2). This may be accomplished by use of a transfer device such as vacuum transfer 10-12 of FIG. 1. The workpiece is generally positioned so that it may be carried by the plate and intersect with the tangential guide stop, as desired, to position orient the workpiece. As the rotating plate 15 carries the workpiece 20, part of the workpiece comes in contact with the tangential guide stop 19 causing the workpiece to pivot out of its orbital path. The workpiece is caused to divert from its orbital path by vector forces resulting from the friction forces between the plate and the workpiece and the passive (resistive) forces of the guide stop.

The plate 15 is rotated in a clockwise direction, as represented by the arrow CW. The lines $r^1$, $r^2$ and $r^3$ represent different radius lines and the small arrows $kf$ each represent the direction of friction forces exerted at that point on the respective line. When part of the workpiece 20 comes in contact with the guide stop 19, a passive force $p^1$ is exerted upon the workpiece and the resultant vector force $vf$ (the passive force plus the friction forces between plate 15 and the moving workpiece) changes the orbital position and path of travel of the workpiece. The passive force of the guide stop is represented by the arrow $p^1$ in FIG. 3 and $p^2$ in FIG. 4 and FIG. 5.

As the plate 15 continues to rotate it carries along with it the workpiece 20. The leading edge of the workpiece, particularly the corner of the leading edge of the workpiece 20, is intercepted by or makes contact with the guide stop 21. Friction force $kf$ created by the rotational movement of the rotating plate (transferred to the workpiece through friction by contact with the rotating plate) and the passive force $p^2$ of the guide stop 21 create another vector force, $vf$ which acts upon the workpiece and moves the workpiece 20 toward registration of the initial point represented as 22 in FIG. 3. It is desired to bring the initial point 22 of the workpiece into registration with the work point 27. After initial point registration is achieved, the vector force continues to adjust the position and orientation of the workpiece (FIG. 5) so that each subsequent point along a predetermined path 32 is registered, in point-to-point registration.

It should be pointed out that some of the various forces affecting the workpiece are represented by arrows. The size of the arrows do not necessarily represent the strength or relative strength of the force represented. The direction of the arrow represents the general direction in which the force so represented is exerted.

The guide stop 19 in FIG. 1 is illustrated as mounted on a hinge 23. The guide stop rests on rollers 24, which, cooperating with the hinge 23 maintains the face of the stop elevated above the rotating plate at a constant, desired level. The guide stop is suspended just above the surface of the plate 15 but sufficiently close to intercept a workpiece on the plate.

The guide stop 21 includes a rotary beater 25 which is driven, through appropriate gearing, by a wheel 26 which in turn is driven by contact with the rotating driven, 15. The rotary beater 25 urges the workpiece in the general direction of the vector force $vf^2$, as an aid bringing about point-to-point registration. It will be found that the beater 25 merely accelerates continued point-to-point registration and is not a necessary component. When sewing along a substantially straight path, such as 32, the beater 25 serves to assist the vector forces in feeding the workpiece into the work station 27 of the sewing machine 28.

The guide stop 21 is illustrated as pivotally mounted on the table 16 so that the guide stop 21 and beater 25 and wheel 26 may be pivotally lifted above the surface of the plate 15, as shown in phantom form 29 in FIG. 1.

The illustration herein shows a workpiece 20 having the configuration of the upper portion of a show, including the eyelets for the shoelaces. If the path of the workpiece along which each point is being presented to the work station 27 includes a concave section, such as 33, it may be desired to briefly remove the tangential guide stop after point-to-point registration along path 32 is effected. Brief removal of the guide stop may be particularly useful in feeding a workpiece having a concave path such as 33, along which are the points to be registered with the work point in the work station.

The tangential guide stop 21 may be coupled to a pivot lift so that the guide stop may be lifted above the workpiece as it is fed into the work station 27. The lifted tangential guide stop 21 is shown in phantom form. It will be appreciated that the sewing machine 28 may include a conventional feed dog apparatus (not shown) which cooperates with a presser foot 31 for feeding a workpiece through a work station. The feed dog apparatus may, after securing the workpiece 20, advance the workpiece through the work station effectively overcoming the friction forces of the rotating plate, but it will be appreciated that delivery of the workpiece to the work station and point-to-point registration has already been accomplished.

Figure 3:
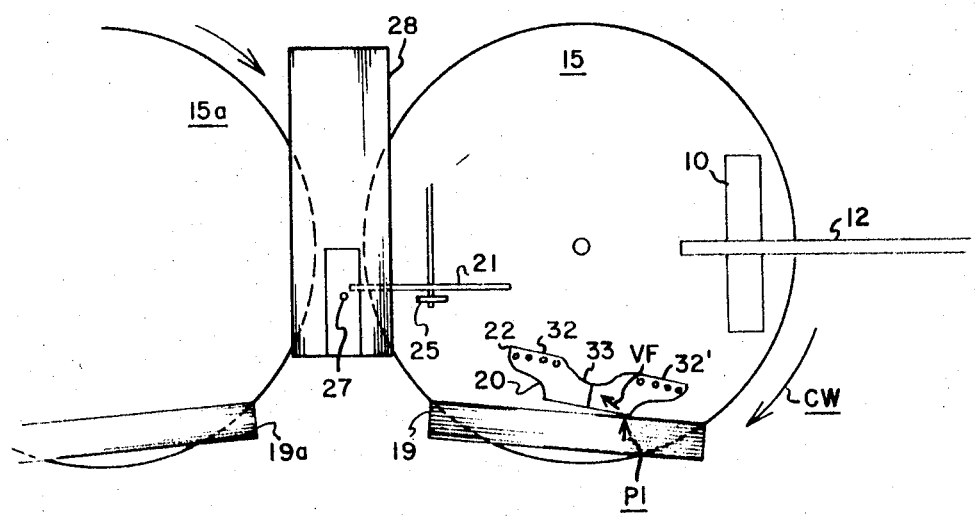
Figure 5:
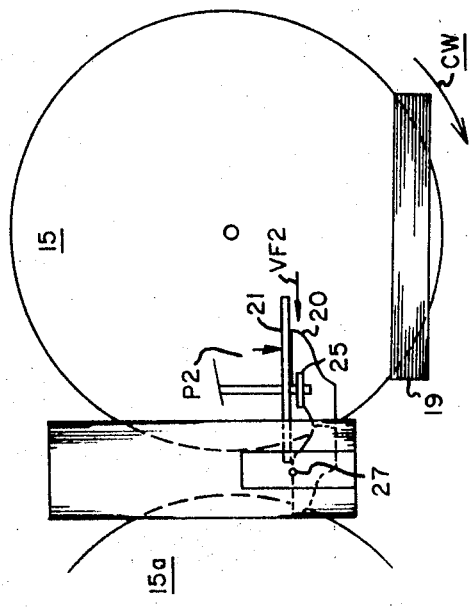
Figure 4:
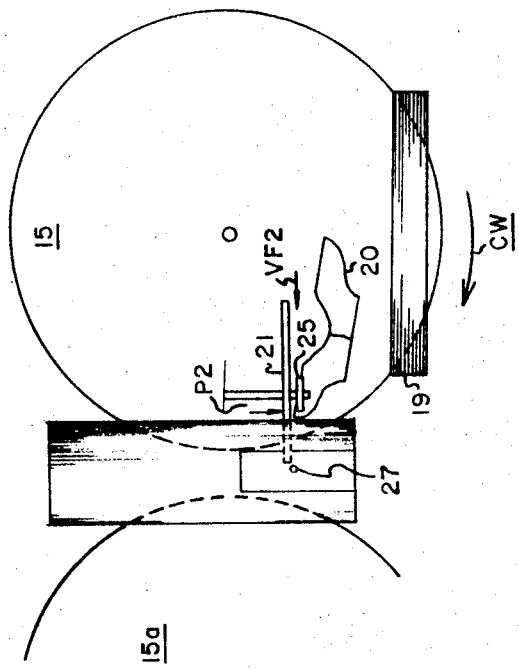

The rotating plate workpiece orienting and point-to-point feeding apparatus has been used successfully to present a canvas show upper portion, having a configuration as generally shown, to the work point of a sewing machine for applying (sewing) a binding strip 36 (FIG. 2) along the compound path 32, 33, 32' (FIG. 3). After completion of the sewing operation, the workpiece is fed from the sewing machine 28 on to a second revolving plate 15a. The cooperative action of the tangential guide stop 19a, 19b, and 19c with the rotating plate 15a orients and delivers the workpiece 20' to a docking position adjacent the guide 19c for removal by a suitable transfer apparatus 38.

What is claimed is:

1. Apparatus for orienting a workpiece in a predetermined orientation and for feeding the oriented workpiece into registration with a work point for registering an initial predetermined point and other sequential points of said workpiece into registration with said work point including
    a work surface having a work path thereacross including a work point therein with which it is desired to register sand initial predetermined point and other sequential points of said workpiece in sequence,
    a rotatable surface substantially integrated into said work surface and substantially in the same plane as said work surface and adapted to be rotated in the said same plane,
    drive means coupled to said rotatable surface for rotating said rotatable surface,
    means for depositing said workpiece one-at-a-time onto said rotatable surface for conveying said workpiece in a curved path toward said work point,
    workpiece interception means positioned closely adjacent to the surface of said rotatable surface and tangential to a circumference of shortened radius of said rotatable surface for intercepting said workpiece during conveyance along said curved path for changing the orientation of said workpiece on said rotatable surface to a desired orientation with respect to a work path approaching said work point for altering the path of said workpiece from said curved path to said work path approach said work point.

2. Apparatus for orienting a workpiece as in claim 1 and in which said work surface includes
    a throat plate of a sewing machine and said work point is defined by a reciprocating sewing machine needle passing through said throat plate and
    said initial point and certain other sequential points define a stitching path across the surface of said workpiece.

3. Apparatus for orienting a workpiece as in claim 1 and in which said work surface includes
    a throat plate of a sewing machine and
    said work point is defined by a reciprocating sewing machine needle passing through said throat plate and
    said initial point and other sequential points individually approach said work point along said work path leading to said work point.

4. Apparatus for orienting a workpiece and feeding sequential points of such workpiece individually into registration with a work point including:
    a work surface including a work point therein,
    a rotatable surface in the same plane as said work surface and having an edge portion thereof adjacent to said workpoint,
    means coupled to said rotatable surface for rotating said rotatable surface at a substantially constant speed,
    transfer means adapted to transfer said workpiece from place to place and for depositing a workpiece on to said rotatable surface for effecting conveyance of said workpiece in a predetermined path by said rotatable surface,
    first stop means positioned closely adjacent to said rotatable surface and tangential to a circumference of shortened radius of said rotatable surface for intercepting said workpiece so conveyed by the rotating surface for creating vector forces acting upon said workpiece for reorienting said workpiece on said rotatable surface and for changing the path of travel of said workpiece,
    second stop means positioned closely adjacent to said rotatable surface and tangential to a circumference of another shortened radius of said rotatable surface, the last-mentioned tangential line being substantially in alignment with the work line approaching said work point, for intercepting said workpiece so conveyed by said rotating surface for creating other vector forces for further reorienting said workpiece on said rotatable surface and for conveying said workpiece along said second stop means toward said work point for registering a first point of said sequential points on said workpiece with said work point and for advancing said workpiece toward said work point along the work line for individually registering sequential points of said workpiece with said work point.

5. Apparatus for orienting a workpiece and feeding sequential points of said workpiece individually into registration with a work point as in claim 4 and in which
    said first stop means intercepts said workpiece and creates vector forces for reorienting said workpiece with respect to said second stop means and
    said second stop means intercepts said reoriented workpiece and creates other vector forces which continue to act upon said workpiece as said workpiece is conveyed along said second stop means toward said work point.

6. Apparatus for orienting a workpiece and for feeding an initial point and certain other sequential points in a predetermined path of point of such workpiece into registration with the work point of the reciprocating needle of a sewing machine for initiating a line of stitches commencing at a desired point including,
    a sewing machine including a work surface and
    a reciprocating needle passing through said work surface and defining a work point,
    a rotatable surface positioned in substantially the same plane as said work surface, said rotatable surface positioned with a portion of the periphery thereof adjacent to said work point,
    drive means coupled to said rotatable surface for rotating said rotatable surface on an axis fixed with respect to said work point,
    transfer means adapted to secure said workpiece and transfer said workpiece from a first location and deposit said workpiece on to said rotatable surface defining a second location for conveying said workpiece while on said rotatable surface toward said work point,
    stop means positioned closely adjacent said rotatable surface and tangential to a circumference of shortened radius of said rotatable surface for intercepting said workpiece during conveyance while on said rotatable surface for altering the position of said workpiece on said rotatable surface and for changing the path of travel of said workpiece for directing the altered-positioned workpiece along a path so that the initial point of said workpiece approaches said work point in said work surface.

7. Apparatus for orienting a workpiece and feeding sequential points of such workpiece individually into registration with a work point as in claim 4 and further including
    rotatable beater means operatively associated with said second stop means for aiding in advancing said workpiece along said second stop means toward said work point.

8. Apparatus for use with a sewing machine for orienting and feeding workpiece to the work point of the sewing machine comprising
    a rotatable plate positioned near to the work point of the sewing machine,
    means for rotating said plate at substantially constant speed,
    means for feeding the workpieces into said rotating plate,
    a plurality of stationary guide stops closely adjacent to the upper surface of the rotating plate and positioned to interrupt the arcuate travel of workpieces on said rotating plate for positioning and orienting the workpiece on the rotating plate with respect to said work point.

9. Apparatus as claimed in claim 8 in which one of said guide stops is located near to said work point and extends toward the work point and another of said guide stops is located upstream of said one guide stop to intercept and orient the workpieces before they reach said one guide stop.

10. Apparatus for use with a sewing machine for orienting and feeding workpieces to the work point of the sewing machine and for feeding the workpieces therefrom comprising first and second rotatable plates positioned generally on opposite sides of the sewing machine, means for rotating said first and second plates, means for feeding the workpieces into said first rotating plate, means for removing the workpieces from said second rotating plate, a first plurality of stationary guide stops closely adjacent to the upper surface of said first rotating plate positioned to intercept the arcuate travel of the workpieces on said first rotating plate for positioning and orienting the workpieces on the first rotating plate with respect to said work point, and a second plurality of stationary guide stops closely adjacent to the upper surface of said second rotating plate positioned to intercept the arcuate travel of the workpieces on said second rotating plate for positioning and orienting the workpieces on the second rotating plate with respect to said removing means.